No. 865,001. PATENTED SEPT. 3, 1907.
M. O. THOMPSON.
HANDLE MAKING MACHINE.
APPLICATION FILED NOV. 30, 1906.

Witnesses:
H. A. Hall
Ernest A. Tulfer

Inventor:
Milton O. Thompson
by his attorney, Charles N. Gooding

No. 865,001. PATENTED SEPT. 3, 1907.
M. O. THOMPSON.
HANDLE MAKING MACHINE.
APPLICATION FILED NOV. 30, 1906.

Witnesses:
H. A. Hall
Ernest A. Felfer

Inventor:
Milton O. Thompson
by his attorney, Charles S. Gooding.

No. 865,001. PATENTED SEPT. 3, 1907.
M. O. THOMPSON.
HANDLE MAKING MACHINE.
APPLICATION FILED NOV. 30, 1906.

Witnesses:
H. A. Hall
Ernest A. Felfer

Inventor:
Milton O. Thompson
by his attorney, Charles S. Gooding

No. 865,001. PATENTED SEPT. 3, 1907.
M. O. THOMPSON.
HANDLE MAKING MACHINE.
APPLICATION FILED NOV. 30, 1906.

Witnesses:
H. A. Hall
Ernest A. Felfer

Inventor:
Milton O. Thompson
by his attorney, Charles S. Gooding

UNITED STATES PATENT OFFICE.

MILTON O. THOMPSON, OF WOLLASTON, MASSACHUSETTS, ASSIGNOR OF ONE-HALF TO CHARLES S. GOODING, TRUSTEE, OF BROOKLINE, MASSACHUSETTS.

HANDLE-MAKING MACHINE.

No. 865,001.  Specification of Letters Patent.  Patented Sept. 3, 1907.

Application filed November 30, 1906. Serial No. 345,621.

*To all whom it may concern:*

Be it known that I, MILTON O. THOMPSON, a citizen of the United States, residing at Wollaston, in the county of Norfolk and State of Massachusetts, have invented new and useful Improvements in Machines for Making Handles, of which the following is a specification.

This invention relates to improvements in machines for making handles such as are used to attach to bundles. In handles of this character there is a spool formed of wood or other suitable material through which a wire is placed with its opposite ends extending beyond the ends of said spool, the free portions of said wire then being bent to form a series of transverse bends. By means of these bent ends the handle may be attached to the string or cord which surrounds a bundle.

The object of this invention is to provide a simple and durable machine which shall automatically place wires in spools and bend the free portions of said wires to form handles of the character described, said machine being certain and reliable in its operation.

The invention consists in the combination and arrangement of parts set forth in the following specification and particularly pointed out in the claims thereof.

Referring to the drawings: Fig. 18 is an enlarged detail section of the feed rolls taken in a vertical plane containing their axes.

Like numerals refer to like parts throughout the several views of the drawings.

Figure 1:
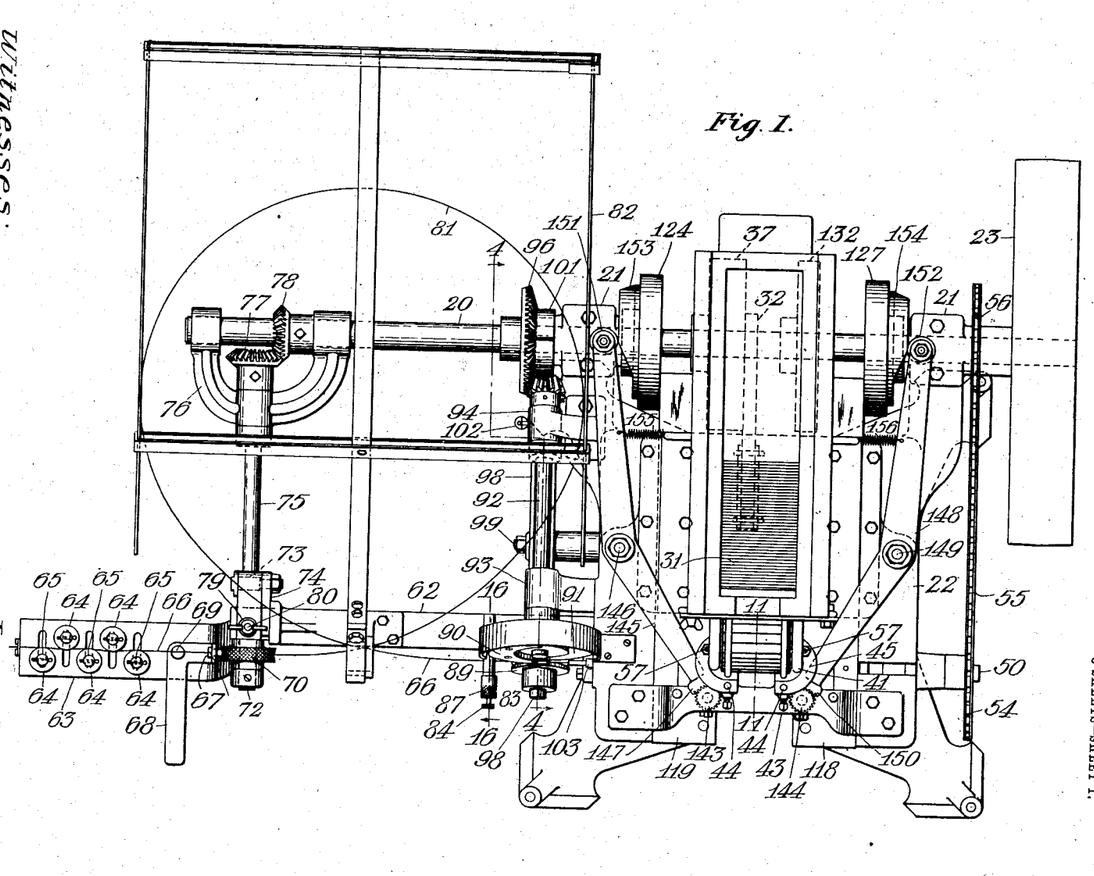
Figure 1 is a plan view of a machine embodying my invention, with the hopper removed.
Figures 2, 15:
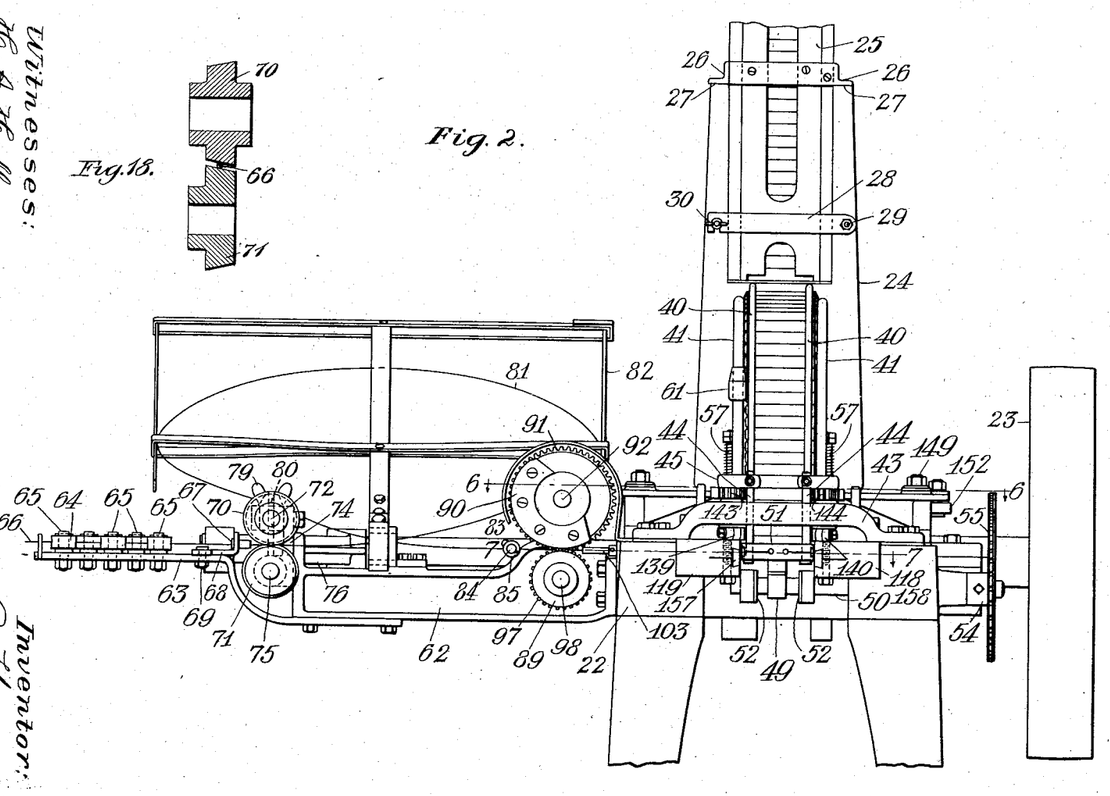
Fig. 2 is a front elevation of the same, partly broken away.
Fig. 15 is a detail section taken on line 15—15 of Fig. 14 looking toward the left.
Figure 3:
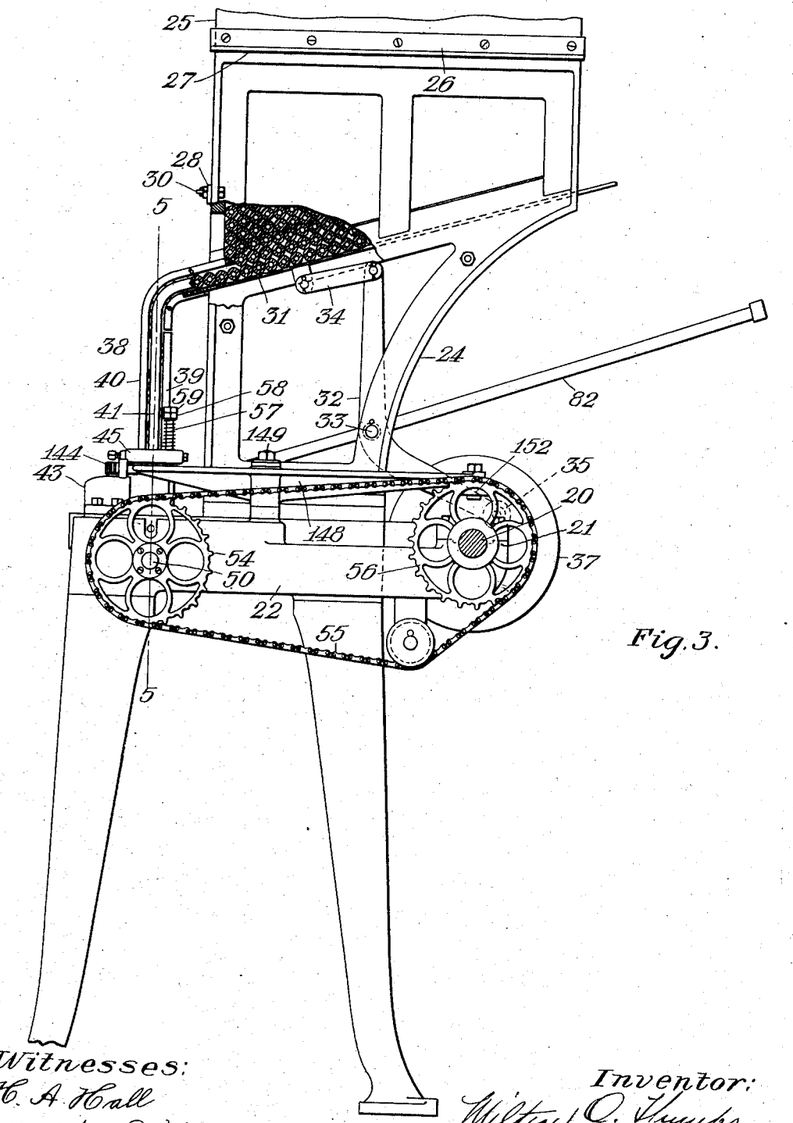
Fig. 3 is an elevation, partly broken away and partly in section, the same being viewed from the right of Figs. 1 and 2.
Figure 4:
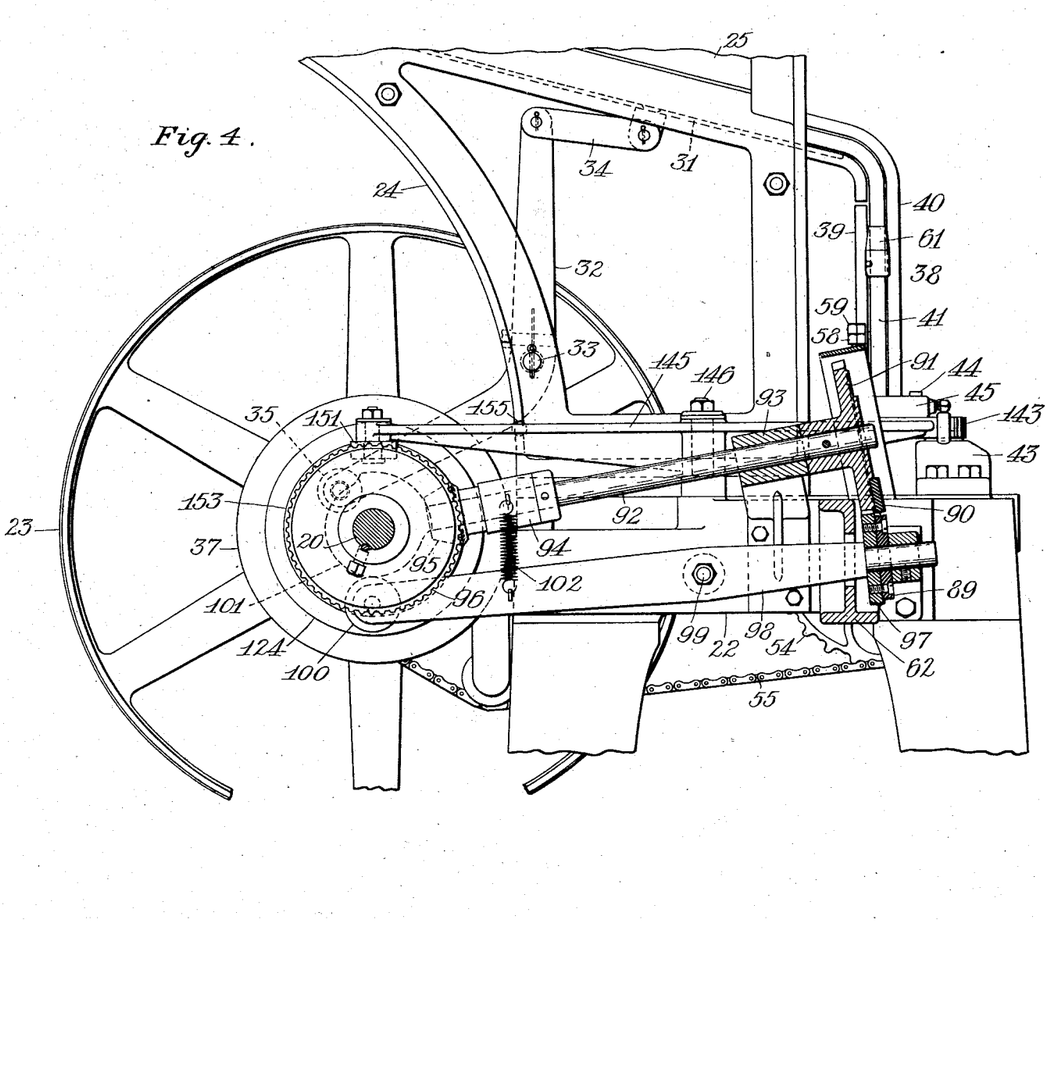
Fig. 4 is an enlarged section, partly in elevation and partly broken away, taken on line 4—4 of Fig. 1 looking toward the right.

In the drawings, 20 is a main driving shaft journaled in bearings 21, 21 formed on the frame 22. The frame 22 is mounted on suitable legs. A driving pulley 23 fast to the shaft 20 is adapted to be driven from any suitable source of power. A frame 24 forming a superstructure for the frame 22 has mounted thereon a hopper 25, said hopper being provided with L-shaped plates 26, 26 fast thereto, said plates being adapted to rest on the upper edges 27, 27 of the frame 24. A bar 28 pivoted at 29 to the frame 24 extends across the front of the hopper 25 and is adapted to hold said hopper in place on the frame 24. The bar 28 is held in its normal position by means of a thumb-nut 30. When it is desired to remove the hopper 25 the thumb-nut 30 may be rotated in the proper direction to release the bar 28. The bar 28 may then be swung on its pivot 29 out of the way of the hopper 25 and said hopper may then be removed by sliding it toward the left (Fig. 3). A reciprocatory slide 31 forming a bottom for the hopper 25 is adapted to slide in ways formed in the frame 24. A bell crank lever 32 pivoted at 33 to the frame 24 is connected at its upper end to the slide 31 by a link 34 and has a cam roll 35 journaled on its lower end.

A cam groove 36 is formed in a disk 37 fast to the driving shaft 20. The cam groove 36 in which the cam roll 35 is located is adapted to rock the bell crank lever 32 on its pivot 33 and thereby impart to the slide 31 a reciprocatory movement. In Fig. 3 the side of the hopper 25 and the frame 24 are partly broken away showing the slide 31 in section and exposing to view a number of spools located in said hopper. A raceway 38 comprising in its construction two back rods 39, 39, two front rods 40, 40, and two side rods 41, 41 is adapted to receive spools from the hopper 25 and guide them downwardly. As the slide 31 is reciprocated, as hereinbefore described, said slide shakes the spools within the hopper 25 and thus causes said spools to move more readily into the raceway 38. The back rods 39, 39 are bent L-shaped at their lower ends 42, 42, said lower ends being adapted to support a column of spools in the raceway 38. The back rods 39, 39, the front rods 40, 40, and the side rods 41, 41 are supported in a bracket or bridge 43 extending across the front of the frame 22.

Two rods 44, 44 slidably mounted in the bracket 43 are joined together at their upper ends by a yoke 45 rigidly secured thereto. The yoke 45 is U-shaped in form and extends around and in back of the back rods 39, 39. An L-shaped wiper 46 is fast at its upper end to the yoke 45 and has a plate 47 secured thereto, said plate being adapted to slide against the back faces 48, 48 of the bracket 43. A cam 49, fast to a rotary shaft 50 is adapted to impart a vertical reciprocatory movement to the wiper 46, the yoke 45, and the rods 44, 44 fast thereto. A stop 51 fast to the rods 44, 44 is adapted to be moved up and down by said rods as the shaft 50 is rotated. An ejector comprising two ejector arms 52, 52 fast to the shaft 50 is adapted to engage the lowermost spool of the column of spools in the raceway 38 and eject said spool from said raceway, the stop 51 being moved upwardly simultaneously with the engagement of the ejectors 52 with said spool.

Figure 5:
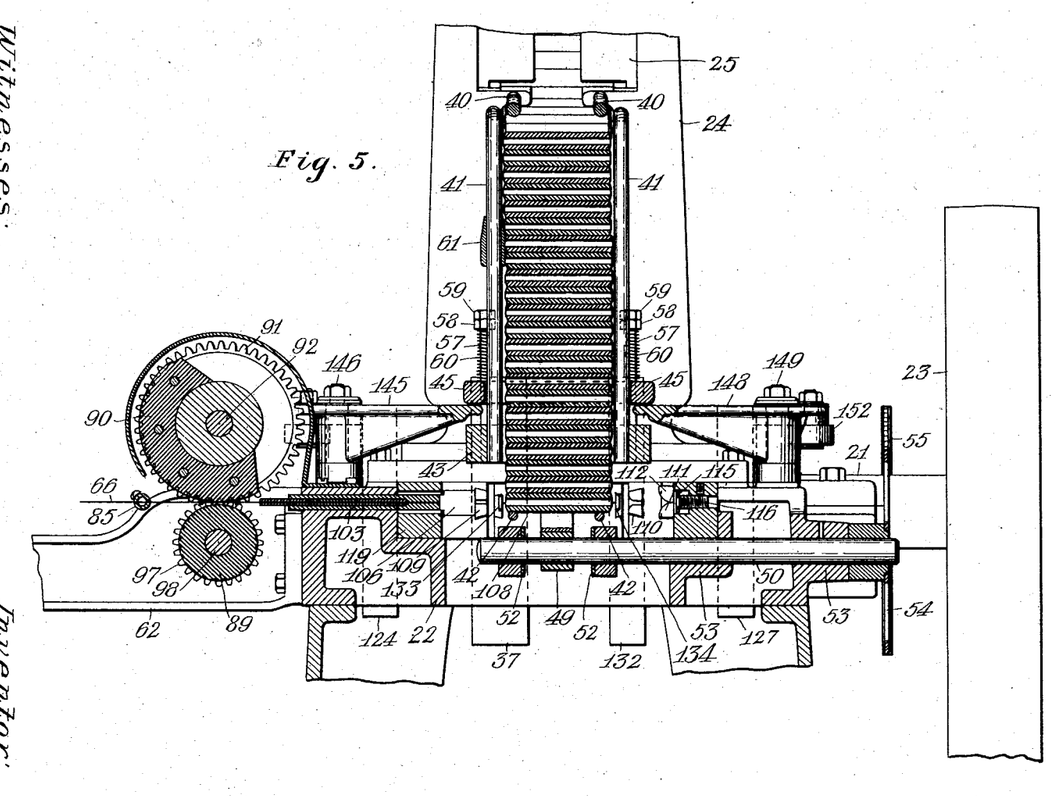
Fig. 5 is an enlarged section, partly broken away and partly in elevation, taken on line 5—5 of Fig. 3 looking toward the right.
Figure 6:
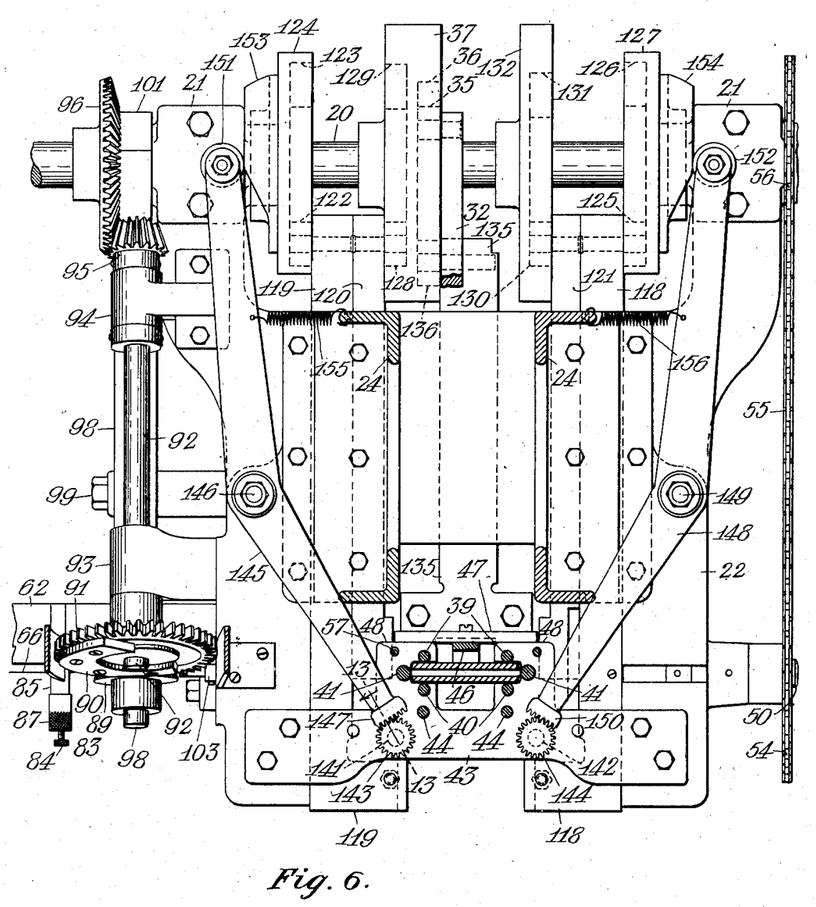
Fig. 6 is an enlarged plan section, partly broken away, taken on line 6—6 of Fig. 2.
Figure 11:
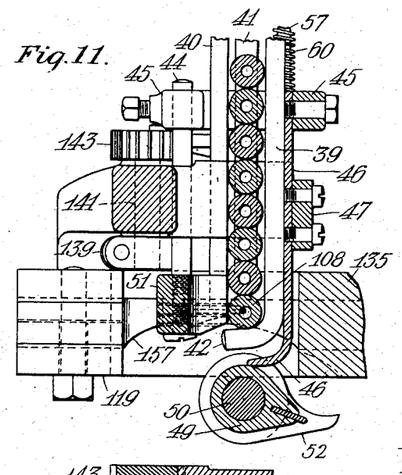
Fig. 11 is an enlarged detail sectional elevation, partly broken away, taken on line 11—11 of Fig. 1.
Figure 12:
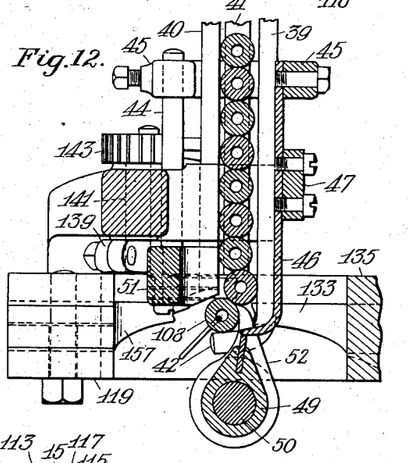
Fig. 12 is a section similar to Fig. 11, but with the ejector shown in the act of ejecting a completed handle.

The ejector arms 52, 52 act as a separator preventing the second spool from passing out of the raceway 38 as the lowermost spool is ejected. The rotary shaft 50 is journaled in bearings 53, 53 formed on the frame 22. A sprocket wheel 54 fast to the shaft 50 is connected by a chain 55 to a sprocket wheel 56, said sprocket wheel 56 being fast to the main driving shaft 20. Two rods 57, 57 passing through the yoke 45 terminate in the bracket 43 and are secured therein. Each of the rods 57 is provided respectively, at its upper end with a nut 58 and a check nut 59. Two helical compression springs 60, 60 surrounding the rods 57, 57 bear at their upper ends against the nuts 58 and at their lower ends against the yoke 45. When the wiper 46 and the parts hereinbefore described fast thereto, have been raised by the cam 49 to the position shown in Fig. 12, the springs 60, 60 act to assist gravity in returning said wiper and said parts fast thereto to the position shown in Fig. 11 as the shaft 50 is rotated. A tapered collar 61 fast to the left hand side rod 41 is adapted to move the descending spools in the raceway toward the right against the right hand side rod 41 as shown in Fig. 5, thus positioning the spools below said collar correctly with relation to the forming blocks hereinafter described which form the ends of the wire.

A bracket 62 fast to the frame 22 has mounted thereon a support 63. A series of straightening rolls 64 are journaled on studs 65, said studs being adjustably mounted on the support 63. A wire 66 which feeds from a reel, not shown, passes through the straightening rolls 64 and thence through a bushing 67, said bushing being mounted in an adjustable bracket 68 pivotally mounted on the support 63 by means of a bolt 69. The wire 66 after passing through the bushing 67 passes between a pair of continuously running feed rolls 70 and 71 which are conical in form and are oppositely tapered as shown in Fig. 18. The feed roll 70 is journaled on an arm 72, said arm being pivotally mounted on a stud 73. The stud 73 is fast to a bracket 74, said bracket 74 being mounted on the bracket 62.

The feed roll 71 is fast to a shaft 75, said shaft being journaled in the bracket 74 and also in a yoke 76. A miter gear 77 fast to the shaft 75 meshes into a miter gear 78 fast to the driving shaft 20, said driving shaft 20 being arranged to rotate in suitable bearings formed in said yoke and said shaft 20 being adapted to support said yoke.

A thumb-nut 79 having screw-threaded engagement with a rod 80 is adapted to move the feed roll 70 with relation to the feed roll 71 and thereby vary the pressure of the feed rolls 70 and 71 against the wire 66. The rate of feed imparted to the wire 66 by the feed rolls 70 and 71 may be varied by loosening the bolt 69 and rocking the bracket 68 thereon, thereby moving said wire longitudinally of the axes of said rolls. The wire 66 after leaving the feed rolls 70 and 71 is coiled or formed in a loop 81, said loop being supported and guided in a frame 82, said frame being adjustably mounted on the bracket 62. The wire 66 passes from the loop 81 through a frictional device or drag 83 fast to the bracket 62. The frictional device 83 comprises a plunger 84 slidably mounted within a bracket 85.

A helical compression spring 86 the tension of which may be adjusted by means of a sleeve-nut 87 surrounds the plunger 84 and bears at one end against said sleeve-nut and at the other end against a head 88 formed on the plunger 84. The head 88 of the plunger 84 bears against the wire 66 and acts as a drag on said wire. The wire 66 after leaving the frictional device 83 passes between a feed roll 89 and a segmental feed plate 90, said segmental feed plate being secured to the face of a bevel gear 91. The bevel gear 91 is fast to a shaft 92 journaled in bearings 93 and 94 and is rotated by means of a bevel pinion 95 meshing into a bevel gear 96, said bevel gear 96 being fast to the driving shaft 20.

The feed roll 89 and a bevel gear 97 to which said feed roll is fast are journaled on a lever 98, said lever being pivoted at 99 to the frame 22. A cam roll 100 journaled on the lever 98 is held in operative engagement with a cam 101 by means of a helical tension spring 102, said spring being fast at one end to the bracket 94 and at the other end to said lever. As the driving shaft 20 is rotated the cam 101 acts to impart a rocking movement to the lever 98, thereby moving the feed wheel 89 toward and away from the segmental feed plate 90. When the feed wheel 89 is moved toward the feed plate 90, said feed wheel and said feed plate operatively engage the wire 66 and feed said wire toward the right, (Figs. 1, 2, 5 and 6). The movement of the feed wheel 89 away from the feed plate 90 is so slight that the teeth of the gears 97 and 91 always remain in mesh.

The linear measure of the periphery of the feed plate 90 is such that in coöperation with the intermittent movement of the feed roll 89 toward and away from said feed plate, said feed roll and feed plate impart an intermittent movement to the wire 66, thereby feeding said wire a predetermined distance with each rotation of the driving shaft 20, said distance being the length of the piece of wire required to complete one handle. The wire 66 after passing between the feed roll 89 and the feed plate 90 passes through a guide 103, said guide being provided with a passage 104 adapted to guide said wire, said guide being also provided with a passage 105 inclined at an angle to the passage 104. The passage 105 is adapted to guide the wire 66 against the front face of a movable cutter 106. The guide 103 constitutes also a stationary cutter so that when the cutter 106 is moved across the passage 105 as hereinafter described the wire 66 is thereby severed leaving a piece of wire 107 with its opposite ends extending from the lowermost spool 108.

Figures 13, 14, 15, 16, 17:
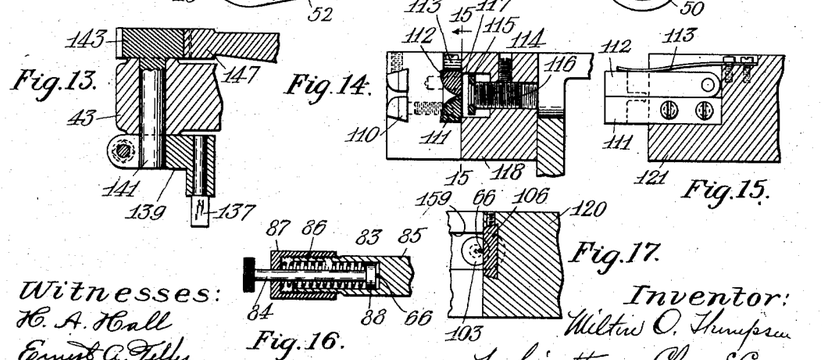
Fig. 13 is an enlarged detail section, partly in elevation and partly broken away, taken on line 13—13 of Fig. 6 looking toward the left.
Fig. 14 is a section taken on line 5—5 of Fig. 3 showing on an enlarged scale a portion of Fig. 5, illustrating the wire stop and the fingers for preventing rebound of the wire.
Fig. 16 is an enlarged detail section, partly in elevation and partly broken away, taken on line 16—16 of Fig. 1 looking toward the left.
Fig. 17 is a detail section taken on line 17—17 of Fig. 10 looking toward the left.

A forming block 109 which is grooved at its front end is adapted to deflect the wire 66 from the front face of the cutter 106 and guide said wire toward the hole in the spool 108. A forming block 110 which constitutes also a guide block is grooved at its front end and is adapted to guide the wire 66 toward a pair of fingers 111 and 112, the finger 111 being fast to a slide 121 and the finger 112 being pivoted to said slide. A flat spring 113 is adapted to normally hold the finger 112 against the finger 111. The fingers 111 and 112 are rounded as shown in Fig. 14 and are adapted to receive the wire 66 after said wire passes across the end of the forming block 110 and prevent said wire from rebounding after striking a stop 114. The stop 114 consists of a plate 115 in which a screw 116 is journaled. The plate 115 is guided in a recess 117 which prevents rotation of said plate and the screw 116 has screw-threaded engagement with a slide 118. The stop 114 may be adjusted toward and away from the forming block 110 by rotating the screw 116. A slide 119 similar to the slide 118 is oppositely placed with relation to the slide 118. Said slides 118 and 119 are adapted to slide in ways formed in the frame 22. The cutter 106 and the forming block 109 are mounted on a slide 120 and the forming block 110 is mounted on the slide 121, said slides 120 and 121 being adapted to slide in ways formed in the frame 22.

A roll 122 journaled on the slide 119 at its rear end is located in a cam groove 123 formed in a disk 124. A cam roll 125 journaled on the slide 118 at its rear end is located in a cam groove 126 formed in a disk 127. The cam groove 126 is identical in contour with the cam groove 123 and as the driving shaft 20 is rotated said cam grooves are adapted to impart to the slides 118 and 119 a reciprocatory movement, said slides moving in unison. A cam roll 128 journaled on the slide 120 at its rear end is located in a cam groove 129 formed in the disk 37. A cam roll 130 journaled on the slide 121 at its rear end is located in a cam groove 131 formed in a disk 132. The contour of the cam groove 129 is identical with the contour of the cam groove 131 and said cam grooves are adapted to impart to the slides 120 and 121 a reciprocatory movement, said slides moving in unison.

Two forming blocks 133 and 134 are fast to a slide 135, said slide being guided in suitable ways formed in the frame 22. A cam roll 136 is journaled on the slide 135 at its rear end and is located in the cam groove 36. The cam groove 36 is adapted to impart a reciprocatory movement to the slide 135 in addition to rocking the bell crank lever 32. A pair of oscillatory forming blocks 137 and 138 are mounted in rocker arms 139 and 140, respectively. The rocker arms 139 and 140 are fast to rocker shafts 141 and 142, respectively, said rocker shafts being formed integral with gears 143 and 144, respectively. A lever 145 pivoted at 146 is provided with a segmental gear 147 meshing into the gear 143. A lever 148 pivoted at 149 to the frame 22 is provided with a segmental gear 150 formed thereon, said gear meshing into the gear 144. Cam rolls 151 and 152 are journaled on the levers 145 and 148, respectively, at the rear ends of said levers.

Cams 153 and 154 against which the cam rolls 151 and 152 bear, respectively, are adapted to rock the levers 145 and 148, respectively, upon their pivots thus imparting rocking movements to the rocker arms 139 and 140 having the forming blocks 137 and 138 mounted thereon, respectively. A spring 155 is adapted to hold the cam roll 151 in contact with the cam 153 and a corresponding spring 156 is adapted to hold the cam roll 152 in contact with the cam 154. Two forming blocks 157 and 158 are mounted on the slides 119 and 118, respectively. The slide 119 is provided with a slot 159 into which the guide 103 projects, said slot permitting said slide to be moved backward and forward with relation to said guide. Two forming blocks 160 and 161 are mounted on the stop 51. The forming blocks 160 and 161 are stationary as regards backward and forward movement, but by reason of the vertical reciprocatory movement of the stop 51 to which said blocks 160 and 161 are fast, move up and down with relation to the lowermost spool 108 in the raceway 38.

Figure 7:
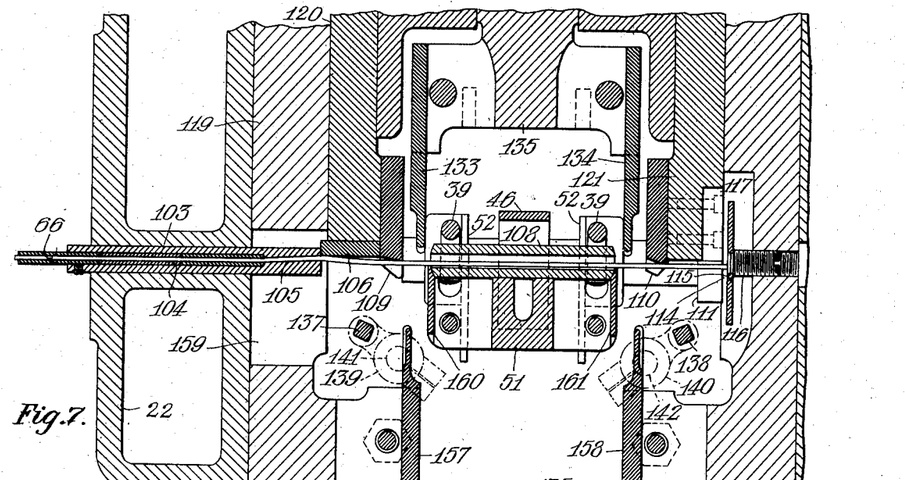
Fig. 7 is an enlarged plan section, partly broken away, taken on line 7—7 of Fig. 2, the forming blocks being shown in the starting position.
Figure 8:
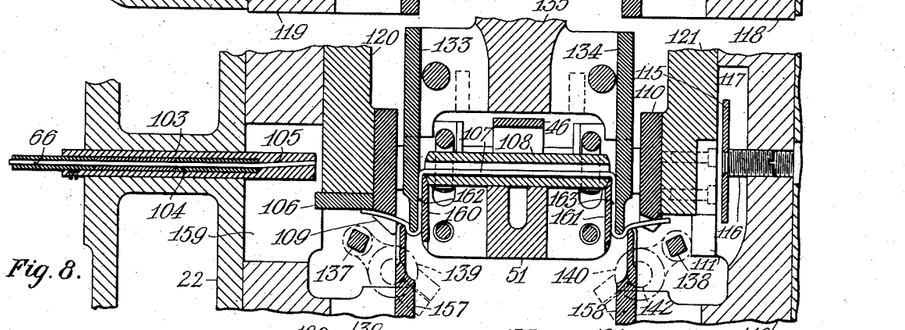
Fig. 8 is a view similar to Fig. 7, but with the wire shown severed and with two of the pairs of forming blocks advanced, the free portions of the piece of wire being bent to form transverse bends extending away from the spool.
Figure 9:
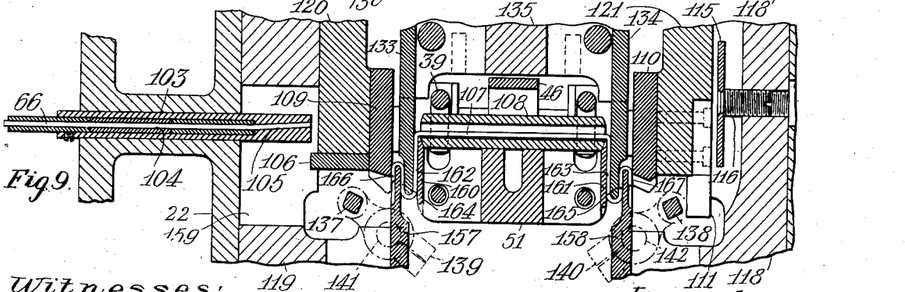
Fig. 9 is a section similar to Fig. 8, but with a third pair of forming blocks shown advanced toward and between the other two pairs of forming blocks, this view showing the return bends extending toward the spool and the final bends extending away from the spool.
Figure 10:
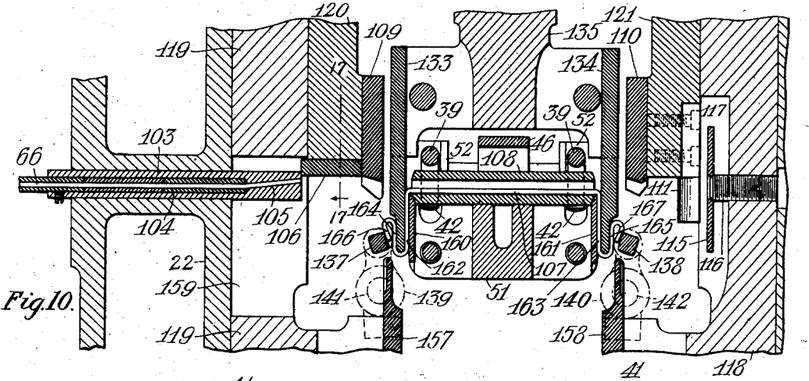
Fig. 10 is a section similar to Fig. 9, but with two of the pairs of forming blocks shown retracted from the position illustrated in Fig. 9 and showing a fourth pair of forming blocks advanced toward each other having bent the final bends toward the return bends to form loops.

The operation of the machine hereinbefore specifically described is as follows: The wire 66 passes between the straightening rolls 64 and thence between the feed rolls 70 and 71 which feed said wire continuously and thereby store up in the coil 81 a surplus from which the feed roll 89 and the feed plate 90 feed said wire intermittently. The movement which the feed roll 89 and the feed plate 90 impart to the wire 66 is so rapid that the coil 81 is provided to supply wire thereto without the necessity of the feed roll 89 and the feed plate 90 drawing the wire 66 quickly through the straightening rolls 64. The length of wire required for the forming of each handle makes necessary the loop 81 from which wire may be rapidly supplied to said feed roll and said feed plate. The wire 66 as it passes from the guide 103 is deflected by the passage 105 against the front face of the cutter 106, is then deflected from said front face by the forming block 109 and is guided by said forming block toward the hole in the spool 108 passing therethrough, the end of said wire striking against the stop 114. The fingers 111 and 112 prevent rebound of the wire 66 after said wire has struck said stop. The slides 120 and 121 now advance, the cutter 106 passing across the right hand end of the guide 103 thereby severing the wire 66 and leaving a piece of wire 107 in the spool 108 with the opposite ends of said piece of wire extending from said spool. The slides 120 and 121 carrying the forming blocks 109 and 110, respectively, continue to move forward to the position shown in Fig. 8. The slide 135 to which the forming blocks 133 and 134 are fast also advances to the position shown in Fig. 8, and faster than the slides 120 and 121. The forming blocks 133 and 134 in advancing from the position shown in Fig. 7 to the position shown in Fig. 8 bend the free portions of the piece of wire 107 around the ends of the forming blocks 160 and 161 thus forming transverse bends 162 and 163 extending away from the spool 108. The blocks 160 and 161 prevent the piece of wire 107 from splitting the ends of the spool 108 while the transverse bends 162 and 163 are being formed. Referring now to Fig. 9, it will be seen that the forming blocks 133 and 134 are now held stationary and that the forming blocks 157 and 158 advance toward the spool 108 thereby bending the ends of the piece of wire 107 to form return bends 164 and 165 extending toward the spool 108 and final bends 166 and 167 extending away from said spool. Referring now to Fig. 10, it will be seen that the forming blocks 109 and 110 are retracted to their starting position and that the forming blocks 157 and 158 are also retracted to their starting position. The rocker arms 139 and 140 carrying the oscillatory forming blocks 137 and 138, respectively, are rocked as hereinbefore described to the position shown in Fig. 10, thereby bending the final bends 166 and 167 toward the return bends 164 and 165, respectively, thus forming loops. The forming blocks 137 and 138 are then returned to the position shown in Fig. 7. The ejector arms 52, 52 then swing into contact with the spool 108 and the forming blocks 160 and 161 and the stop 51 are moved upward simultaneously therewith and said ejector arms act to eject the completed handle from the raceway 38. Each rotation of the driving shaft 20 causes a recurrence of the sequence of movements hereinbefore described, it being understood that with each rotation of said driving shaft one handle is completed and ejected from the machine.

Having thus described my invention what I claim and desire by Letters Patent to secure is:

1. In a machine of the character described, means for feeding a wire into a spool with the opposite ends of said wire extending from said spool, two forming blocks located adjacent to the opposite ends, respectively, of said spool, a pair of forming blocks adapted to bend the free ends of said wire to form transverse bends extending away from said spool, a second pair of forming blocks adapted to form return bends extending toward said spool, a third pair of forming blocks adapted to form final bends extending away from said spool, and mechanism for operating said blocks.

2. In a machine of the character described, means for feeding a wire into a spool with the opposite ends of said wire extending from said spool, a pair of forming blocks adapted to bend the free ends of said wire to form transverse bends extending away from said spool, a second pair of forming blocks adapted to form return bends extending toward said spool, a third pair of forming blocks adapted to form final bends extending away from said spool, and mechanism for operating said forming blocks.

3. In a machine of the character described, means for feeding a wire into a spool with the opposite ends of said wire extending from said spool, two forming blocks located adjacent to the opposite ends, respectively, of said spool, three pairs of forming blocks movable transversely of said spool, said blocks coöperating to bend the free ends of said wire to form a series of transverse bends, and mechanism for operating said blocks.

4. In a machine of the character described, means for feeding a wire into a spool with the opposite ends of said wire extending from said spool, instrumentalities for bending the free portions of said wire to form transverse bends extending away from said spool, return bends extending toward said spool, and final bends extending away from said spool, and means for bending said final bends toward said return bends to form loops.

5. In a machine of the character described, means for feeding a wire into a spool with the opposite ends of said wire extending from said spool, two forming blocks located adjacent to the opposite ends, respectively, of said spool, a pair of slidable forming blocks adapted to bend the free ends of said wire to form transverse bends extending away from said spool, a second pair of slidable forming blocks adapted to form return bends extending toward said spool, a third pair of slidable forming blocks adapted to form final bends extending away from said spool, and mechanism for imparting reciprocatory movements to said slidable forming blocks.

6. In a machine of the character described, means for feeding a wire into a spool with the opposite ends of said wire extending from said spool, two forming blocks located adjacent to the opposite ends, respectively, of said spool, a pair of slidable forming blocks adapted to bend the free ends of said wire to form transverse bends extending away from said spool, a second pair of slidable forming blocks adapted to form return bends extending toward said spool, a third pair of slidable forming blocks adapted to form final bends extending away from said spool, mechanism for imparting reciprocatory movements to said slidable forming blocks, two pivoted forming blocks adapted to bend said final bends toward said return bends to form loops, and mechanism to impart rocking movements to said pivoted forming blocks.

7. In a machine of the character described, means for feeding a wire through a spool, a stop against which one end of said wire is fed, means for severing said wire leaving a piece of wire with its opposite ends extending from said spool, instrumentalities for bending the free ends of said piece of wire to form transverse bends extending away from said spool, return bends extending toward said spool, and final bends extending away from said spool, and means for bending said final bends toward said return bends to form loops.

8. In a machine of the character described, a hopper adapted to contain spools, a raceway adapted to receive and guide spools from said hopper, means for feeding a wire through one of said spools in said raceway, a stop against which one end of said wire is fed, means for severing said wire leaving a piece of wire with its opposite ends extending from said spool, instrumentalities for bending the free ends of said piece of wire to form transverse bends extending away from said spool, return bends extending toward said spool, and final bends extending away from said spool, and instrumentalities for bending said final bends toward said return bends to form loops.

9. In a machine of the character described, a hopper adapted to contain spools, a raceway adapted to receive and guide spools from said hopper, means for feeding a wire into the lowermost spool in said raceway with the opposite ends of said wire extending from said spool, instrumentalities for bending the free ends of said wire to form a series of bends while said spool is in said raceway, and means for ejecting said lowermost spool from said raceway after said wire has been bent.

10. In a machine of the character described, a hopper adapted to contain spools, a raceway adapted to receive and guide spools from said hopper, a movable stop adapted to normally close the outlet of said raceway, means for feeding a wire through the lowermost spool in said raceway, means for severing said wire leaving a piece of wire with its opposite ends extending from said spool, instrumentalities for bending the free ends of said wire while said spool is in said raceway, and instrumentalities for moving said stop from said outlet and ejecting said lowermost spool from said raceway after said wire has been bent.

11. In a machine of the character described, means for feeding a wire through a spool, a movable cutter having a guiding surface, a stationary cutter provided with a passage adapted to guide said wire, said passage inclined at an angle to said guiding surface, means for moving said movable cutter across said passage, thereby severing said wire and leaving a piece of wire with its opposite ends extending from said spool, and instrumentalities for bending the free ends of said piece of wire.

12. In a machine for feeding wire through an orifice, a guide provided with a groove located in alinement with said orifice, and a guide adapted to guide said wire against one surface of said guide block and at an angle to said groove.

13. In a machine of the character described, means for feeding a wire through a spool, a movable cutter having a guiding surface, a stationary cutter provided with a passage adapted to guide said wire, said passage inclined at an angle to said guiding surface, means for moving said movable cutter across said passage, thereby severing said wire and leaving a piece of wire with its opposite ends extending from said spool, and instrumentalities for bending the free ends of said piece of wire to form a series of transverse bends.

14. In a machine of the character described, means for feeding a wire through a spool, a guide block having a guiding surface located between said feeding means and said spool, means to deflect said wire against said guiding surface, a block adapted to deflect said wire from said guiding surface, said second block adapted to guide said wire into said spool, and instrumentalities for bending the free ends of said wire to form a series of transverse bends.

15. In a machine of the character described, means for feeding a wire through a spool, a stop against which one end of said wire is fed, a movable cutter having a guiding surface, a stationary cutter provided with a passage adapted to guide said wire, said passage inclined at an angle to said guiding surface, means for moving said movable cutter across said passage, thereby severing said wire and leaving a piece of wire with its opposite ends extending from said spool, and instrumentalities for bending the free ends of said wire to form a series of transverse bends.

16. In a machine of the character described, means for feeding a wire through a spool, a stop against which one end of said wire is fed, means for preventing rebound of said wire after striking said stop, and instrumentalities for bending the free ends of said wire.

17. In a machine of the character described, a hopper adapted to receive and guide spools from said hopper, means for feeding a wire through the lowermost spool in said raceway, a stop against which said wire is fed, means for severing said wire leaving a piece of wire with its opposite ends extending from said spool, instrumentalities for bending the free ends of said wire to form a series of transverse bends while said spool is in said raceway, and means for ejecting said lowermost spool from said raceway after said wire has been bent.

18. In a machine of the character described, a hopper adapted to contain spools, a raceway adapted to receive and guide spools from said hopper, means for feeding a wire through the lowermost spool in said raceway, means for severing said wire leaving a piece of wire with its opposite ends extending from said lowermost spool, instrumentalities for bending the free ends of said piece of wire, and a rotary ejector adapted to engage said lowermost spool and eject it from said raceway.

19. In a machine of the character described, a hopper adapted to contain spools, a raceway adapted to receive and guide spools from said hopper, means for feeding a wire through the lowermost spool in said raceway, means for severing said wire leaving a piece of wire with its opposite ends extending from said lowermost spool, a movable stop adapted to normally close the outlet of said raceway, instrumentalities for bending the free ends of said piece of wire, a rotary shaft, an ejector mounted on said shaft and adapted to engage said lowermost spool, and a cam mounted on said shaft, said cam adapted to move said stop out of the path of said lowermost spool.

20. In a machine of the character described, means for feeding a wire through a spool, a stop against which one end of said wire is fed, means for severing said wire leaving a piece of wire with its opposite ends extending from said spool, a pair of forming blocks adapted to bend the free ends of said wire to form transverse bends extending away from said spool, a second pair of forming blocks adapted to form return bends extending toward said spool, a third pair of forming blocks adapted to form final bends extending away from said spool, and mechanism for moving said forming blocks.

21. In a machine of the character described, means for feeding a wire through a spool, a stop against which one end of said wire is fed, means for severing said wire leaving a piece of wire with its opposite ends extending from said spool, a pair of forming blocks adapted to bend the free ends of said wire to form transverse bends extending away from said spool, a second pair of forming blocks adapted to form return bends extending toward said spool, a third pair of forming blocks adapted to form final bends extending away from said spool, mechanism for moving said forming blocks, a pair of oscillatory forming blocks adapted to bend said final bends toward said return bends to form loops, and mechanism for moving said oscillatory forming blocks.

22. In a machine of the character described, a hopper adapted to contain spools, a raceway adapted to receive and guide said spools from said hopper, means for feeding a wire through the lowermost spool in said raceway, a stop against which one end of said wire is fed, means for severing said wire leaving a piece of wire with its opposite ends extending from said spool, a pair of forming blocks adapted to bend the free ends of said piece of wire to form transverse bends extending away from said spool, a second pair of forming blocks adapted to form return bends extending toward said spool, a third pair of forming blocks adapted to form final bends extending away from said spool, and mechanism for operating said forming blocks.

23. In a machine of the character described, means for feeding a wire continuously toward a spool, means for imparting to said wire an intermittent feeding movement toward said spool, said second-named means located between said first-named means and said spool, means to guide said wire into said spool, means for severing said wire leaving a piece of wire with its opposite ends extending from said spool, and instrumentalities for bending the free ends of said wire.

In testimony whereof I have hereunto set my hand in presence of two subscribing witnesses.

MILTON O. THOMPSON.

Witnesses:
Louis A. Jones,
Annie J. Dailey.